(12) United States Patent
Johnson

(10) Patent No.: US 12,461,379 B2
(45) Date of Patent: Nov. 4, 2025

(54) REFLECTIVE GAUSSIAN TO FLAT-TOP AND OTHER BEAM SHAPERS

(71) Applicant: Raytheon Company, Waltham, MA (US)

(72) Inventor: Timothy P. Johnson, Torrance, CA (US)

(73) Assignee: Raytheon Company, Arlington, VA (US)

( * ) Notice: Subject to any disclaimer, the term of this patent is extended or adjusted under 35 U.S.C. 154(b) by 943 days.

(21) Appl. No.: 17/374,207

(22) Filed: Jul. 13, 2021

(65) Prior Publication Data

US 2023/0018018 A1 Jan. 19, 2023

(51) Int. Cl.
*G02B 27/09* (2006.01)
*G02B 27/00* (2006.01)
(Continued)

(52) U.S. Cl.
CPC ......... *G02B 27/09* (2013.01); *G02B 27/0025* (2013.01); *G02B 27/0927* (2013.01); *G02B 27/0977* (2013.01); *H04B 10/503* (2013.01); *H04B 10/69* (2013.01); *G02B 27/0983* (2013.01)

(58) Field of Classification Search
CPC .... G02B 27/09; G02B 27/0983; G02B 27/00; G02B 27/0025; G02B 27/0927; G02B 27/0977; H04B 10/503; H04B 10/69
See application file for complete search history.

(56) References Cited

U.S. PATENT DOCUMENTS 8,277,060 B2 10/2012 Cook
10,677,651 B1 6/2020 Bullard
(Continued)

FOREIGN PATENT DOCUMENTS

EP 1617257 A1 * 1/2006 ......... G02B 21/0032

OTHER PUBLICATIONS

International Search Report and Written Opinion of the International Searching Authority dated Jul. 14, 2022 in connection with International Patent Application No. PCT/US2022/025171, 11 pages.
(Continued)

*Primary Examiner* — Stephone B Allen
*Assistant Examiner* — Tamara Y. Washington

(57) ABSTRACT

An apparatus includes a reflective beam shaper configured to receive an input optical signal having a first energy distribution and generate an output optical signal having a second energy distribution different from the first energy distribution. The reflective beam shaper includes multiple reflective mirrors including a first mirror and a second mirror. The first mirror may include a first aspheric reflector configured to reflect the input optical signal as a first intermediate optical signal having a changing energy distribution. The second mirror may include a second aspheric reflector configured to reflect one of the first intermediate optical signal or a second intermediate optical signal as the output optical signal. A third mirror may include a third aspheric reflector configured to reflect the first intermediate optical signal as the second intermediate optical signal having another changing energy distribution.

20 Claims, 3 Drawing Sheets

(51) Int. Cl.
  *H04B 10/50* (2013.01)
  *H04B 10/69* (2013.01)

(56) References Cited

U.S. PATENT DOCUMENTS

| | | |
|---|---|---|
| 2004/0037387 A1 | 2/2004 | Antoni et al. |
| 2009/0257118 A1* | 10/2009 | Heritier ............ G02B 19/0052 359/399 |
| 2017/0184865 A1 | 6/2017 | Doucet et al. |
| 2018/0107006 A1 | 4/2018 | Hertwig et al. |

OTHER PUBLICATIONS

Shafer, "Gaussian to flat-top intensity distributing lens", Optics and Laser Technology, vol. 14, No. 3, Jun. 1982, 2 pages.

Zhang et al., "Single-Element Laser Beam Shaper for Uniform Flat-Top Profiles", Advances In Multimedia Information Processing—PCM 2002, vol. 11, No. 16, Aug. 2003, 7 pages.

"Flat Top Converter | Top Hap, Transforms Gaussian beam to a Flat-Top beam", Workshop of Photonics (WOP), https://wophotonics.com/products/flat-top-converter-top-hat/, 2021, 5 pages.

Ngcobo et al, "Tuneable Gaussian to flat-top resonator by amplitude beam shaping using a digital laser", Laser Resonators, Microresonators, and Beam Control XVI, Proc. of SPIE, vol. 8960, Feb. 2014, 5 pages.

"Reflective Laser Beam Shaping: Beam Shaping for High Power and Short Pulse Durations", Edmund Optics Inc., https://www.edmundoptics.com/knowledge-center/trending-in-optics/reflective-laser-beam-shaping/, Feb. 2020, 4 pages.

"Top-Hat beam shaping with aspheres", Asphericon, https://www.asphericon.com/en/blog/detail/shape-it-til-you-make-it-top-hat-beam-shaping-with-aspheres/, Jun. 2020, 5 pages.

"Top-Hat/Flat-Top Beam Shaper application notes", Holo/Or Ltd., https://www.holoor.co.il/application/beam-shaper-top-hat/, Mar. 2019, 8 pages.

* cited by examiner ature of the reflective beam shaper according to this disclosure.
REFLECTIVE GAUSSIAN TO FLAT-TOP AND OTHER BEAM SHAPERS

TECHNICAL FIELD

This disclosure relates generally to optical systems. More specifically, this disclosure relates to reflective Gaussian to flat-top and other beam shapers.

BACKGROUND

Optical sources often generate beams of optical energy having Gaussian distributions, such as when a laser source generates a laser beam having a Gaussian energy distribution. With this type of energy distribution, the optical beam has higher concentrations of optical energy at and near the center of the optical beam, and lower concentrations of optical energy are present moving towards outer edges of the beam.

SUMMARY

This disclosure provides reflective Gaussian to flat-top and other beam shapers.

In a first embodiment, an apparatus includes a reflective beam shaper configured to receive an input optical signal having a first energy distribution and generate an output optical signal having a second energy distribution different from the first energy distribution. The reflective beam shaper includes multiple reflective mirrors including a first mirror and a second mirror.

In a second embodiment, a system includes an optical source configured to generate an input optical signal having a first energy distribution. The system also includes a reflective beam shaper configured to receive the input optical signal and generate an output optical signal having a second energy distribution different from the first energy distribution. The reflective beam shaper includes multiple reflective mirrors including a first mirror and a second mirror.

In a third embodiment, a method includes obtaining multiple reflective mirrors including a first mirror and a second mirror. The method also includes positioning the multiple mirrors relative to an optical source to form a reflective beam shaper. The reflective beam shaper is configured to receive an input optical signal having a first energy distribution from the optical source and generate an output optical signal having a second energy distribution different from the first energy distribution.

Other technical features may be readily apparent to one skilled in the art from the following figures, descriptions, and claims.

BRIEF DESCRIPTION OF THE DRAWINGS

For a more complete understanding of this disclosure, reference is made to the following description, taken in conjunction with the accompanying drawings, in which.

DETAILED DESCRIPTION

Figure 1:
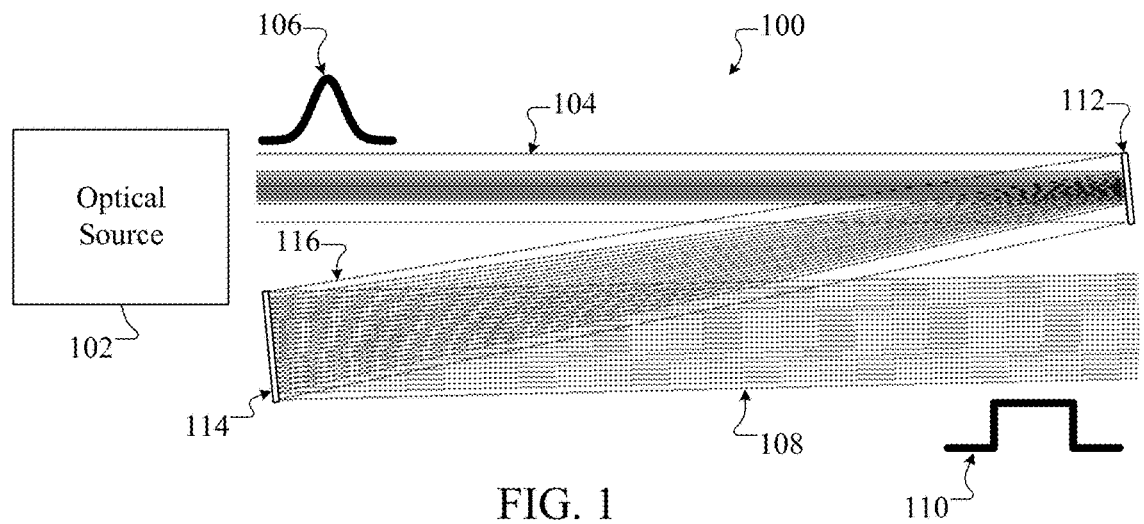
FIG. 1 illustrates an example system containing a reflective beam shaper according to this disclosure.

FIGS. 1 through 4, described below, and the various embodiments used to describe the principles of the present disclosure are by way of illustration only and should not be construed in any way to limit the scope of this disclosure. Those skilled in the art will understand that the principles of the present disclosure may be implemented in any type of suitably arranged device or system.

As described above, optical sources often generate beams of optical energy having Gaussian distributions, such as when a laser source generates a laser beam having a Gaussian energy distribution. With this type of energy distribution, the optical beam has higher concentrations of optical energy at and near the center of the optical beam, and lower concentrations of optical energy are present moving towards outer edges of the beam. While this type of energy distribution may be acceptable in various applications, it may be undesirable in other applications.

A more even distribution of optical energy throughout the cross-section of an optical beam is often referred to as a "flat-top" distribution, which is also referred to as a "top-hat" distribution or a "uniform" distribution. This type of energy distribution may still include some variations in the energy level of the optical beam across the beam's cross-section, but the energy distribution is substantially constant. In this document, the phrase "substantially constant" refers to being constant to within about or exactly ±10% of a nominal value, although other thresholds lower than ±10% (such as ±5%, ±3%, or ±1%) may be supported or achieved in any particular embodiment.

Various approaches for converting optical beams having Gaussian energy distributions to optical beams having flat-top energy distributions have been developed, but these approaches rely on aspherical refractive lenses that are inserted into the optical pathways of the optical beams. While effective, these approaches can suffer from a number of shortcomings because they rely on refractive lenses. For example, refractive lenses can create back-scatter and ghost reflections in a larger system, which can be problematic in high-energy laser (HEL) systems and other systems. Also, refractive lenses can suffer from bulk absorption issues, meaning the refractive lenses can absorb some of the optical energy passing through the refractive lenses. This can cause problems such as temperature-dependent variations in the refractive index of the material forming the refractive lenses, which can change how the refractive lenses alter the optical beams. In addition, there can be mounting difficulties caused by mismatches in the coefficients of thermal expansion (CTEs) between the refractive lenses and their mounts, and the refractive lenses may have spectrally-varying characteristics such as dispersion.

This disclosure describes various approaches for providing reflective beam shapers. In these approaches, aspheric or other non-symmetrical mirrors are used to reflect an optical beam and alter a distribution of optical energy within the optical beam. This allows the reflective mirrors to convert an initial distribution of optical energy within an input optical beam (such as a Gaussian energy distribution) into a different distribution of optical energy within an output optical beam (such as a flat-top energy distribution).

The use of reflective mirrors (rather than refractive lenses) to perform beam shaping can provide various benefits or advantages depending on the implementation. For example, reflective mirrors can produce little or no back-scatter and ghost reflections in a larger system, which can be useful in HEL systems or other systems. Also, reflective mirrors can have little or no bulk absorption issues, and there are few if any issues associated with temperature-dependent variations in the refractive index of the material forming the reflective mirrors. In addition, reflective mirrors can be mounted more easily with CTE-matched mounts or other mounts, and reflective mirrors can provide spectrally-invariant operation.

Reflective beam shapers can be useful in a number of applications. For example, in some applications, there may be a need or a desire to provide substantially-uniform illumination in the near field (meaning close to an aperture providing illumination from an optical source), and a reflective beam shaper can be used to produce substantially-uniform illumination in the near field. As another example, there may be a need or a desire to increase the peak illumination striking at least one specific object or area in the far field (meaning far away from an aperture providing illumination from an optical source), and a reflective beam shaper can be used to increase the amount of far field illumination on the at least one specific object or area. For a given aperture size and laser power, a uniform beam at a near-field aperture results in a maximum possible peak far-field irradiance. As yet another example, there may be a need or a desire to pre-distort an optical beam in order to provide substantially-uniform illumination in the far field, and a reflective beam shaper can be used to provide an optical beam that is pre-distorted to provide substantially-uniform far field illumination. Any other or additional uses of the beam shapers described in this patent document may be supported and are within the scope of this disclosure.

FIG. 1 illustrates an example system 100 containing a reflective beam shaper according to this disclosure. As shown in FIG. 1, the system 100 includes an optical source 102, which is used to generate an input optical signal 104. The optical source 102 includes any suitable structure configured to generate at least one optical signal, such as a laser. In some embodiments, the optical source 102 may represent a continuous wave (CW) or pulsed laser. The input optical signal 104 includes any suitable beam of optical energy that will undergo beam shaping to change an energy distribution. The input optical signal 104 may have any suitable frequency/wavelength, power level, pulse duration, or other characteristics. The input optical signal 104 here also includes an initial energy distribution 106, which indicates how optical energy is spatially distributed within a cross-section of the input optical signal 104. In this example, the initial energy distribution 106 has a Gaussian form, which means there are higher concentrations of optical energy at and near the center of the input optical signal 104 and decreasing or no concentrations of optical energy moving away from the center of the input optical signal 104.

The input optical signal 104 is modified using a reflective beam shaper to produce an output optical signal 108. The output optical signal 108 represents the input optical signal 104 as modified to have a different energy distribution 110. In this example, the energy distribution 110 has a flat-top form, which means there is a substantially uniform concentration of optical energy throughout the cross-section of the output optical signal 108. As described below, the cross-sectional size of the output optical signal 108 can also be larger compared to the cross-sectional size of the input optical signal 104.

The output optical signal 108 may be used in any suitable manner. For example, the output optical signal 108 may be provided to a telescope or other structure for output through an aperture. The output optical signal 108 may be used to illuminate one or more objects or areas of interest in the near field or in the far field. If desired, the output optical signal 108 may be pre-distorted (such as based on one or more Fourier transforms) to account for atmospheric distortions or other distortions that might be experienced by the output optical signal 108 during travel. The output optical signal 108 may be used in any other suitable manner.

In this example, the reflective beam shaper is formed using two reflective mirrors 112 and 114. The mirrors 112 and 114 are aspheric reflectors, which means that (for each mirror 112 and 114) the radius of curvature of at least one part of that mirror differs from the radius of curvature of at least one other part of that mirror. As shown in FIG. 1, the mirror 112 reflects the input optical signal 104 to produce an intermediate optical signal 116, which represents an optical signal in which the distribution of optical energy is changing during propagation of the intermediate optical signal 116. In this example, the optical energy of the intermediate optical signal 116 is expanding from the more-centralized Gaussian energy distribution to the more-uniform flat-top energy distribution. The mirror 114 reflects the intermediate optical signal 116 to produce the output optical signal 108.

Each mirror 112 and 114 represents any suitable reflective structure having a desired aspherical or other non-symmetrical shape. In some embodiments, each mirror 112 and 114 is aspheric or freeform (Zernike) so that the reflective beam shaper formed using the mirrors 112 and 114 can simultaneously (i) adjust the intensity profile (energy distribution) of the input optical signal 104 and (ii) output a flat/collimated wavefront in the output optical signal 108. Note that the mirrors 112 and 114 are tilted so that they are "off-axis" mirrors in the system 100, which means that each of the mirrors 112 and 114 receives an optical signal in one direction and reflects the optical signal in a different direction. The use of off-axis mirrors 112 and 114 here helps to avoid the creation of obscurations by the beam shaper.

Figure 2:
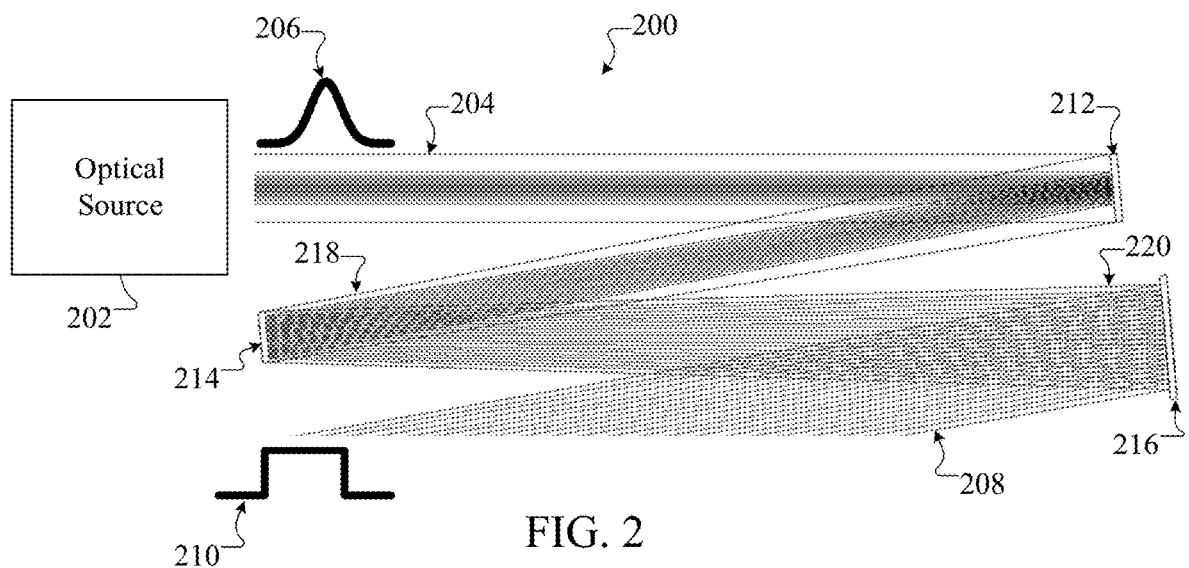
FIG. 2 illustrates another example system containing a reflective beam shaper according to this disclosure.

FIG. 2 illustrates another example system 200 containing a reflective beam shaper according to this disclosure. As shown in FIG. 2, the system 200 includes an optical source 202, which may be the same as or similar to the optical source 102 in FIG. 1 described above. The optical source 202 is used to generate an input optical signal 204, which may be the same as or similar to the input optical signal 104 in FIG. 1 described above. The input optical signal 204 has an initial energy distribution 206, which in this example has a Gaussian form. The input optical signal 204 is modified using a reflective beam shaper to produce an output optical signal 208. The output optical signal 208 represents the input optical signal 204 as modified to have a different energy distribution 210, which in this example has a flat-top form. As described below, the cross-sectional size of the output optical signal 208 can also be larger compared to the cross-sectional size of the input optical signal 204. The output optical signal 208 may be used in any suitable manner, such as the various ways described above.

In this example, the reflective beam shaper is formed using three reflective mirrors 212, 214, and 216. The mirrors 212, 214, and 216 are aspheric reflectors, which means that (for each mirror 212, 214, and 216) the radius of curvature of at least one part of that mirror differs from the radius of curvature of at least one other part of that mirror. As shown in FIG. 2, the mirror 212 reflects the input optical signal 204 to produce a first intermediate optical signal 218, which represents an optical signal in which the distribution of optical energy is changing during propagation of the intermediate optical signal 218. The mirror 214 reflects the first intermediate optical signal 218 to produce a second intermediate optical signal 220, which again represents an optical signal in which the distribution of optical energy is changing during propagation of the intermediate optical signal 220. In this example, the optical energies of the intermediate optical signals 218 and 220 are expanding from the more-centralized Gaussian energy distribution to the more-uniform flat-top energy distribution. The mirror 216 reflects the second intermediate optical signal 220 to produce the output optical signal 208.

Each mirror 212, 214, and 216 represents any suitable reflective structure having a desired aspherical or other non-symmetrical shape. In some embodiments, each mirror 212, 214, and 216 is aspheric or freeform (Zernike) so that the reflective beam shaper formed using the mirrors 212, 214, and 216 can simultaneously (i) adjust the intensity profile (energy distribution) of the input optical signal 204 and (ii) output a flat/collimated wavefront in the output optical signal 208. Again, note that the mirrors 212, 214, and 216 are tilted so that they are "off-axis" mirrors, which helps to avoid the creation of obscurations by the beam shaper.

In the examples of the beam shapers shown in FIGS. 1 and 2, because of the off-axis configurations of the mirrors 112-114 and 212-216, it is much more challenging to control aberrations in the output optical signals 108, 208 compared to using on-axis refractive lenses. This is because the aperture associated with each mirror needs to be centered on the mirror's vertex in order to achieve symmetric beam intensity shaping, but this causes axial astigmatism when the mirror is tilted. As a result, the final mirror 114 or 216 can be designed to correct for this axial astigmatism, or one or more of the mirrors 112-114 or 212-216 can otherwise be designed to provide a suitable correction for this axial astigmatism. As a result, the mirror profiles of these mirrors 112-114 and 212-216 are more complex to design. In some cases, a software tool (such as the OPTICSTUDIO software tool from ZEMAX LLC) can be used to identify the actual asymmetric or other surfaces or other design parameters of the mirrors 112-114 or 212-216 in a beam shaper in order to achieve the desired modification to a reflected optical signal.

Note that the cross-sectional size of the output optical signal 108, 208 may be larger than the cross-sectional size of the corresponding input optical signal 104, 204. This can be achieved due to the reflections provided by the mirrors 112-114 or 212-216. In some cases, for example, the input optical signal 104, 204 may have a diameter of about 10 millimeters, and the output optical signal 108, 208 may have a diameter of about 30 millimeters. Also note that the two beam shapers shown in FIGS. 1 and 2 may have different operational characteristics. For instance, the three-mirror beam shaper shown in FIG. 2 may have better uniformity, may have lower wavefront error (WFE), and may not involve the use of freeform mirrors compared to the two-mirror beam shaper shown in FIG. 1. However, the three-mirror beam shaper shown in FIG. 2 can accumulate larger WFE from surface and alignment tolerances involving the mirrors 212-216 compared to the two-mirror beam shaper shown in FIG. 1.

Although FIGS. 1 and 2 illustrate two examples of systems 100 and 200 containing reflective beam shapers, various changes may be made to FIGS. 1 and 2. For example, each input optical signal 104, 204 may be obtained from any suitable source, and each input optical signal 104, 204 may or may not be obtained directly from a laser or other optical source 102, 202. Also, a reflective beam shaper may include more than three reflective mirrors. In addition, each of the Gaussian and flat-top distributions may be replaced with any other suitable distribution of optical energy here, in which case the designs of the mirrors 112-114 or 212-216 can be modified as needed to convert between the two specific distributions of optical energy being used.

Figure 3A:
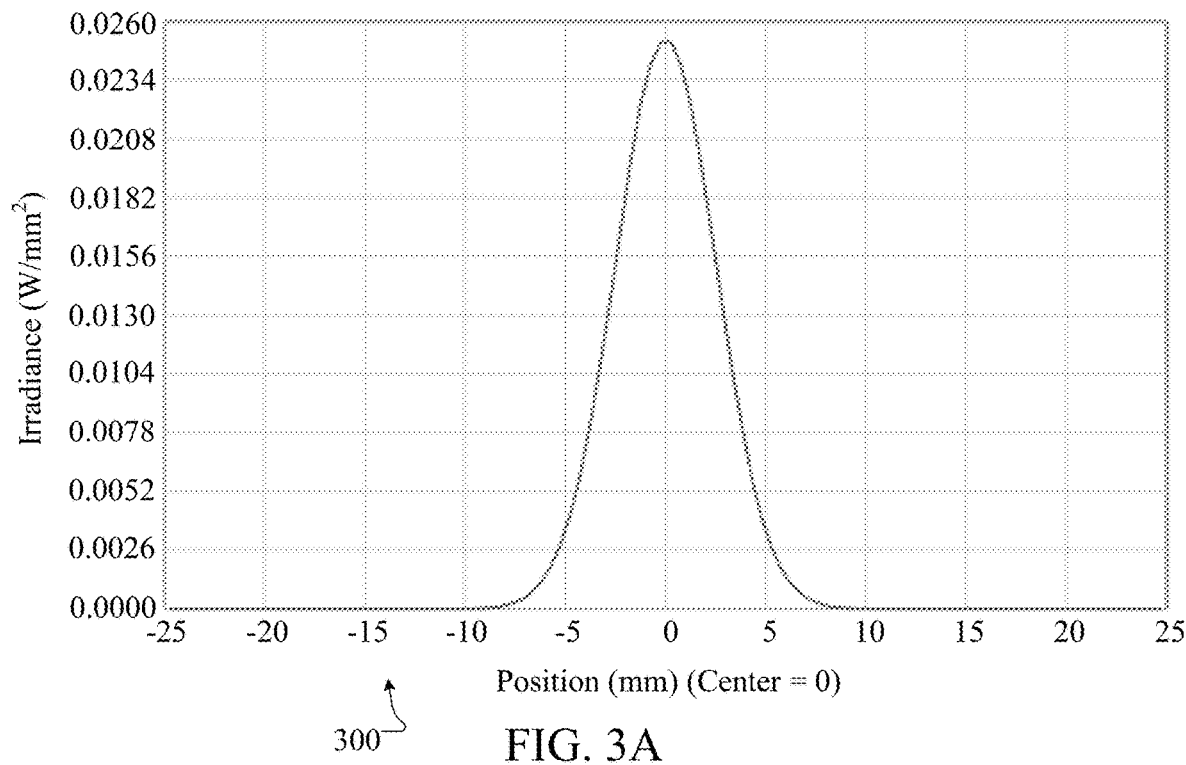
FIGS. 3A and 3B illustrate example results that may be obtained using a reflective beam shaper according to this disclosure.
Figure 3B:
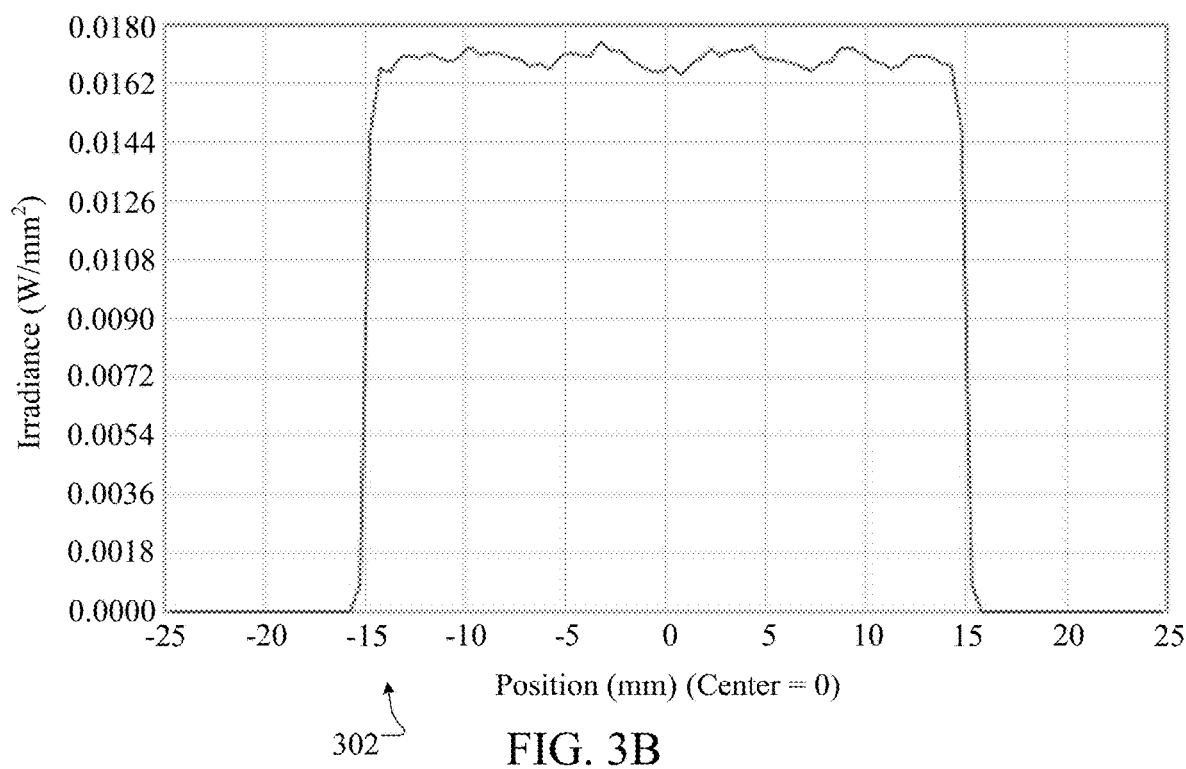

FIGS. 3A and 3B illustrate example results that may be obtained using a reflective beam shaper according to this disclosure. In particular, FIG. 3A illustrates an example graph 300 plotting an initial energy distribution of an input optical signal that is provided to a reflective beam shaper, such as the input optical signal 204. Similarly, FIG. 3B illustrates an example graph 302 plotting a modified energy distribution of an output optical signal that is provided from a reflective beam shaper, such as the output optical signal 208. Each graph 300 and 302 plots distance from a center of an optical beam along the horizontal axis and irradiance (optical energy per unit area) along the vertical axis.

As can be seen here, the graph 300 indicates that the input optical signal 204 has a Gaussian energy distribution, where the input optical signal 204 has a smaller cross-sectional size and includes more optical energy at and near the center of the input optical signal 204. In contrast, the graph 302 indicates that the output optical signal 208 has a flat-top energy distribution, where the output optical signal 208 has a larger cross-sectional size and includes a more uniform distribution of optical energy (relative to the input optical signal 204). While there is some variation in the energy distribution shown in the graph 302, this variation is minor compared to the overall amplitude of the energy level. Moreover, this variation may be further reduced by suitable processing of the output optical signal 208 if needed, or this variation may be "washed out" during propagation of the output optical signal 208 through the atmosphere or other transmission medium.

Although FIGS. 3A and 3B illustrate examples of results that may be obtained using a reflective beam shaper, various changes may be made to FIGS. 3A and 3B. For example, the specific Gaussian and flat-top distributions shown here can vary based on a number of factors, such as the design of the optical source providing the input optical signal and the design of the reflective beam shaper (like the shapes and numbers of mirrors) producing the output optical signal. Also, any other suitable distributions of optical energy may be used here. In addition, note that similar characteristics may be achieved in the system 100 of FIG. 1.

Figure 4:
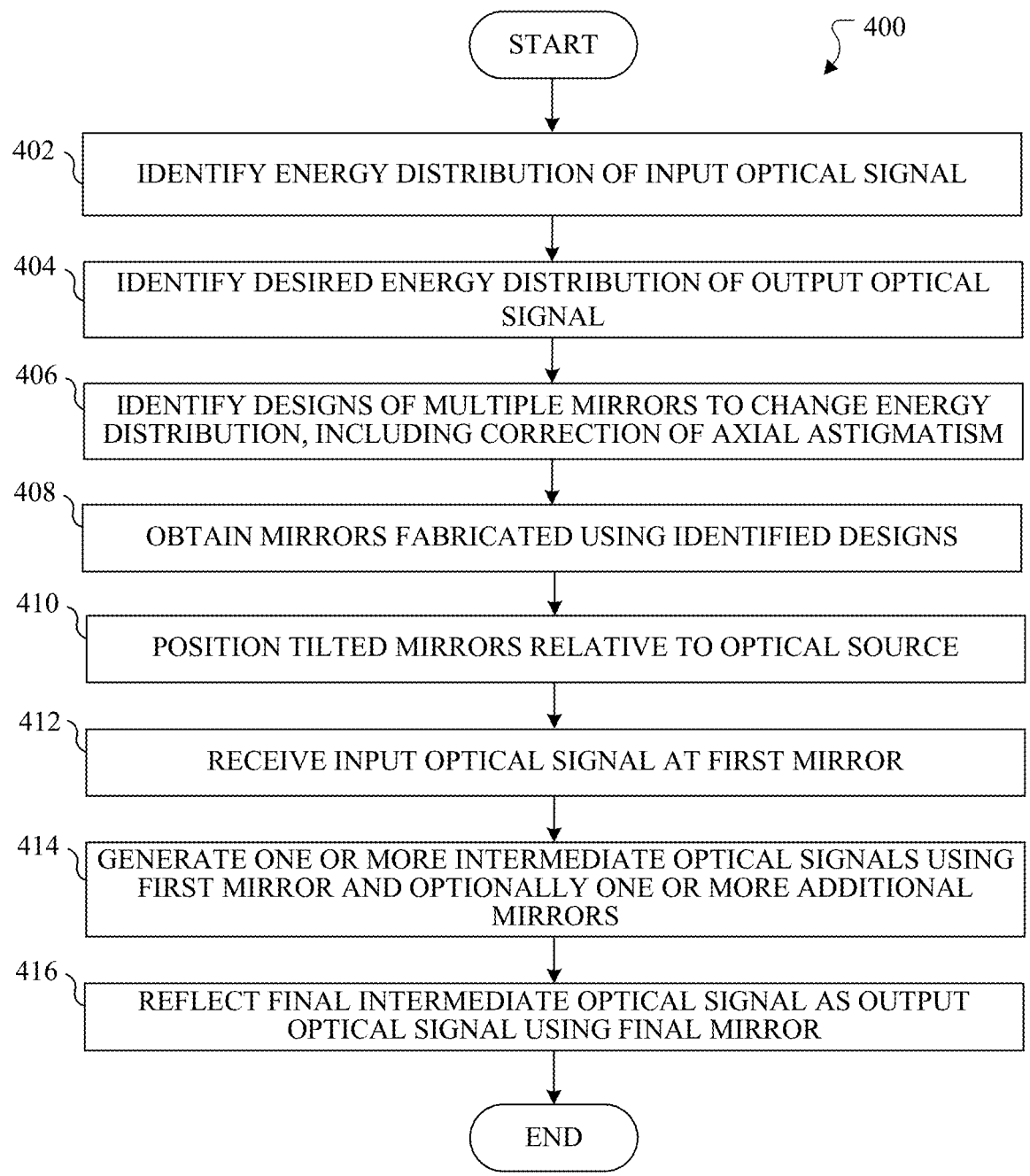
FIG. 4 illustrates an example method for creating and using a reflective beam shaper according to this disclosure.

FIG. 4 illustrates an example method 400 for creating and using a reflective beam shaper according to this disclosure. For ease of explanation, the method 400 is described in conjunction with the beam shapers shown in FIGS. 1 and 2 discussed above. However, the method 400 may be used in conjunction with any other suitable beam shaper designed in accordance with this disclosure.

As shown in FIG. 4, an initial energy distribution associated with an input optical signal is identified at step 402, and a desired energy distribution associated with an output optical signal is identified at step 404. This may include, for example, identifying the energy distribution of an input optical signal 104, 204 that is generated by a specific optical source 102, 202. As a particular example, this may include measuring the actual energy distribution of an input optical signal 104, 204 that is generated by a specific laser or other optical source 102, 202. In some cases, the energy distribution of the input optical signal 104, 204 is Gaussian in form. This may also include identifying the desired energy distribution of an output optical signal 108, 208. As a particular example, this may include identifying the desired energy distribution of an output optical signal 108, 208 based on the intended application of the output optical signal 108, 208. In some cases, the energy distribution of the output optical signal 108, 208 is flat-top in form.

Designs for multiple mirrors of a beam shaper that provide a desired change in optical energy distribution are identified at step 406. This may include, for example, identifying the aspheric, freeform, or other asymmetrical shapes for the reflective surfaces of the mirrors 112-114 or 212-216 that provide the desired change from the initial energy distribution to the desired energy distribution. In particular embodiments, this may include using a software tool to identify the shapes for the reflective surfaces of the mirrors 112-114 or 212-216. This also includes identifying one or more corrections in one or more of the mirrors 112-114 or 212-216 that correct for the axial astigmatism introduced by tilting the mirrors 112-114 or 212-216.

Mirrors fabricated using the identified designs are obtained at step 408. This may include, for example, fabricating the mirrors 112-114 or 212-216 or receiving fabricated mirrors 112-114 or 212-216 from another party. The mirrors are positioned at suitable locations relative to an optical source and are tilted off-axis at step 410. This may include, for example, positioning the mirrors 112-114 or 212-216 at suitable locations and tilting the mirrors 112-114 or 212-216 at suitable angles so that an input optical signal 104, 204 received from an optical source 102, 202, as modified by the mirrors 112-114 or 212-216, will be delivered to a desired location or in a desired direction.

An input optical signal is received at a first of the mirrors at step 412. This may include, for example, the mirror 112, 212 receiving the input optical signal 104, 204 from the optical source 102, 202. One or more intermediate optical signals are generated using the first mirror and optionally one or more additional ones of the mirrors at step 414. This may include, for example, the mirror 112, 212 reflecting the input optical signal 104, 204 as an intermediate optical signal 116, 218. This may optionally also include the mirror 214 reflecting the intermediate optical signal 218 as an intermediate optical signal 220. Each intermediate optical signal 116, 218, 220 may have an energy distribution that changes in a desired manner as the intermediate optical signal 116, 218, 220 propagates through space. A final one of the mirrors reflects a final (and possibly the only) intermediate optical signal as an output optical signal at step 416. This may include, for example, the mirror 114, 216 reflecting the intermediate optical signal 116, 220 as the output optical signal 108, 208. Ideally, the output optical signal 108, 208 has the desired energy distribution identified earlier.

Although FIG. 4 illustrates one example of a method 400 for creating and using a reflective beam shaper, various changes may be made to FIG. 4. For example, while shown as a series of steps, various steps in FIG. 4 may overlap, occur in parallel, occur in a different order, or occur any number of times. Also, different parties may perform different steps in FIG. 4, such as when a designer performs steps 402-406, a manufacturer performs steps 408-410, and an end user performs steps 412-416.

It may be advantageous to set forth definitions of certain words and phrases used throughout this patent document. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present disclosure should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus comprising:
a reflective beam shaper configured to receive an input optical signal having a first energy distribution and generate an output optical signal having a second energy distribution different from the first energy distribution;
wherein the reflective beam shaper comprises multiple reflective mirrors including a first mirror and a second mirror;
wherein the multiple mirrors are tilted and represent off-axis mirrors;
wherein at least one of the mirrors is configured to correct for axial astigmatism caused by the tilting of the multiple mirrors; and
wherein the second energy distribution comprises a substantially constant energy distribution across a cross-section of the output optical signal.

2. The apparatus of claim 1, wherein:
the first mirror comprises a first aspheric reflector configured to reflect the input optical signal as a first intermediate optical signal having a changing energy distribution; and
the second mirror comprises a second aspheric reflector configured to reflect one of the first intermediate optical signal or a second intermediate optical signal as the output optical signal.

3. The apparatus of claim 2, wherein:
the multiple mirrors further include a third mirror; and
the third mirror comprises a third aspheric reflector configured to reflect the first intermediate optical signal as the second intermediate optical signal having another changing energy distribution.

4. The apparatus of claim 1, wherein the output optical signal has a larger cross-sectional size compared to the input optical signal.

5. The apparatus of claim 1, wherein variations in an energy level of the output optical signal across the cross-section of the output optical signal are constant to within ±10% of a nominal value.

6. An apparatus comprising:
a reflective beam shaper configured to receive an input optical signal having a first energy distribution and generate an output optical signal having a second energy distribution different from the first energy distribution;
wherein the reflective beam shaper comprises multiple reflective mirrors including a first mirror and a second mirror;
wherein the first energy distribution is a Gaussian energy distribution;
wherein the second energy distribution is a flat-top energy distribution; and
wherein the second energy distribution comprises a substantially constant energy distribution across a cross-section of the output optical signal.

7. The apparatus of claim 6, wherein variations in an energy level of the output optical signal across the cross-section of the output optical signal are constant to within ±10% of a nominal value.

8. The apparatus of claim 7, wherein:
the first energy distribution is a Gaussian energy distribution; and
the second energy distribution is a flat-top energy distribution.

9. A system comprising:
an optical source configured to generate an input optical signal having a first energy distribution; and
a reflective beam shaper configured to receive the input optical signal and generate an output optical signal having a second energy distribution different from the first energy distribution;
wherein the reflective beam shaper comprises multiple reflective mirrors including a first mirror and a second mirror;
wherein the multiple mirrors are tilted and represent off-axis mirrors;
wherein at least one of the mirrors is configured to correct for axial astigmatism caused by the tilting of the multiple mirrors; and
wherein the second energy distribution comprises a substantially constant energy distribution across a cross-section of the output optical signal.

10. The system of claim 9, wherein:
the first mirror comprises a first aspheric reflector configured to reflect the input optical signal as a first intermediate optical signal having a changing energy distribution; and
the second mirror comprises a second aspheric reflector configured to reflect one of the first intermediate optical signal or a second intermediate optical signal as the output optical signal.

11. The system of claim 10, wherein:
the multiple mirrors further include a third mirror; and
the third mirror comprises a third aspheric reflector configured to reflect the first intermediate optical signal as the second intermediate optical signal having another changing energy distribution.

12. The system of claim 11, wherein at least one of the first intermediate optical signal and the second intermediate optical signal has an expanding energy distribution.

13. The system of claim 9, wherein variations in an energy level of the output optical signal across the cross-section of the output optical signal are constant to within ±10% of a nominal value.

14. The system of claim 9, wherein:
the first energy distribution is a Gaussian energy distribution; and
the second energy distribution is a flat-top energy distribution.

15. The system of claim 9, wherein the optical source comprises a laser.

16. A method comprising:
obtaining multiple reflective mirrors including a first mirror and a second mirror; and
positioning the multiple mirrors relative to an optical source to form a reflective beam shaper, the reflective beam shaper configured to receive an input optical signal having a first energy distribution from the optical source and generate an output optical signal having a second energy distribution different from the first energy distribution;
wherein the multiple mirrors are tilted and represent off-axis mirrors;
wherein at least one of the mirrors is configured to correct for axial astigmatism caused by the tilting of the multiple mirrors; and
wherein the second energy distribution comprises a substantially constant energy distribution across a cross-section of the output optical signal.

17. The method of claim 16, wherein:
the first mirror comprises a first aspheric reflector configured to reflect the input optical signal as a first intermediate optical signal having a changing energy distribution; and
the second mirror comprises a second aspheric reflector configured to reflect one of the first intermediate optical signal or a second intermediate optical signal as the output optical signal.

18. The method of claim 17, wherein:
the multiple mirrors further include a third mirror; and
the third mirror comprises a third aspheric reflector configured to reflect the first intermediate optical signal as the second intermediate optical signal having another changing energy distribution.

19. The method of claim 16, further comprising:
identifying the first energy distribution associated with the input optical signal;
identifying the second energy distribution associated with the output optical signal; and
obtaining designs for the multiple mirrors to generate the second energy distribution based on the first energy distribution.

20. The method of claim 16, wherein variations in an energy level of the output optical signal across the cross-section of the output optical signal are constant to within ±10% of a nominal value.

* * * * *